March 21, 1967     S. A. GUERRIERI     3,310,381
PROCESS FOR PRODUCING HIGH PURITY OXYGEN BY CHEMICAL MEANS
Filed Oct. 20, 1965
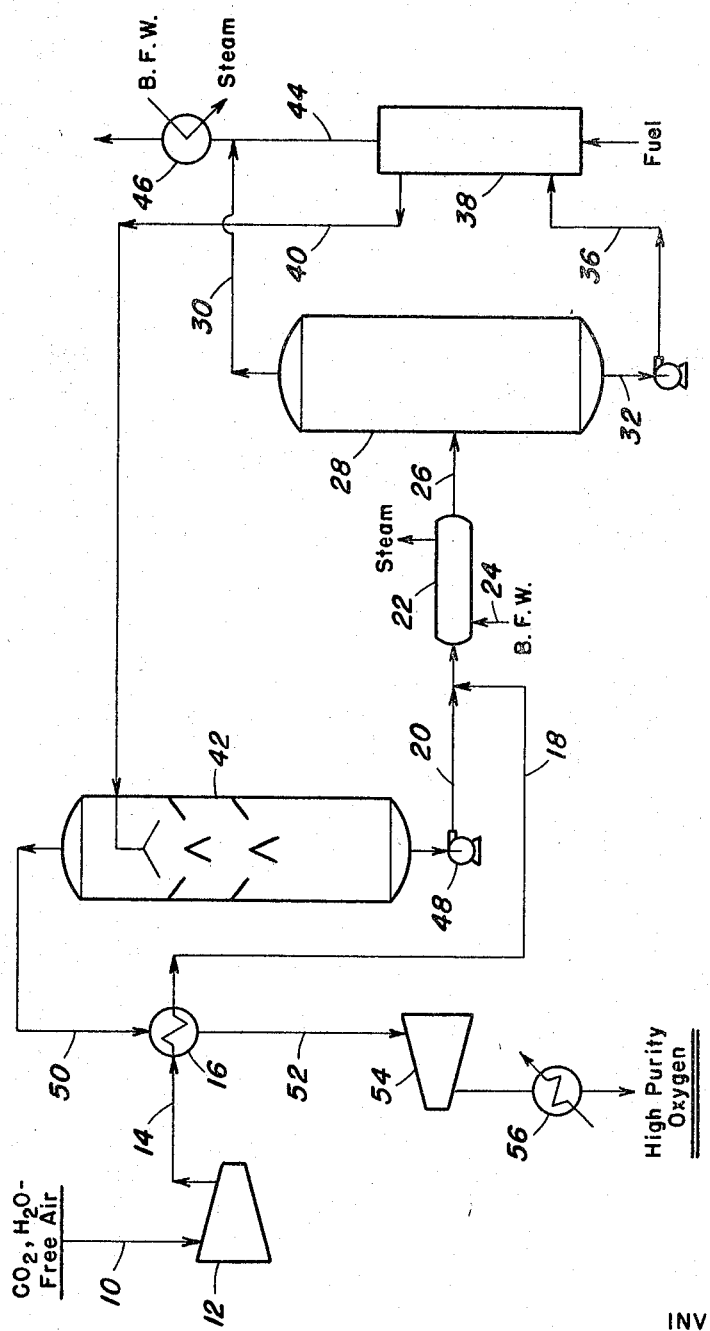
INVENTOR
Salvatore A. Guerrieri
BY *Marn & Jangarathis*
ATTORNEYS

3,310,381
PROCESS FOR PRODUCING HIGH PURITY OXYGEN BY CHEMICAL MEANS

Salvatore A. Guerrieri, Rowayton, Conn., assignor to The Lummus Company, New York, N.Y., a corporation of Delaware
Filed Oct. 20, 1965, Ser. No. 498,221
9 Claims. (Cl. 23—221)

This invention relates generally to the production of high purity oxygen and, more particularly, the invention relates to a process for producing high purity oxygen in tonnage quantities by a chemical process. A plant for producing oxygen according to this process is both more economical to build and to operate than a physical separation (i.e. liquefaction) plant.

Substantially all commercial oxygen produced at present is obtained by the separation of oxygen from other constituents in air by physical methods involving compression and low temperature distillation of liquefied air. This process has been refined to the point where very little improvement may be reasonably expected, and very slight, if any reduction in cost, appears to be possible. Typically, large scale oxygen plants of this nature are capable of producing high purity oxygen for about twelve to fifteen dollars per ton. The use of oxygen in industrial processes would be considerably expanded if the cost could be materially reduced, and the present process is directed toward that end.

Chemical processes for the production of oxygen are attractive because of the possible low energy consumption. The theoretical minimum work requirement for making pure oxygen (1 atm., 70° F.) from air is about 0.024 kwh./lb. $O_2$. With a chemical process this figure can be approached as closely as desired, at the cost of indefinitely increasing equipment size; with reasonable operating conditions it has been estimated with the present invention that an energy requirement of 0.10 kwh./lb. $O_2$ can be achieved. The energy used in low temperature distillation is in the order of 0.17 kwh./lb. $O_2$, and there is little possibility of a sizable reduction of this figure, as noted above. Distillation is an inherently irreversible process which involves a flow of heat from a hot reservoir to a cold one with no work accomplished.

Over the years a large number of chemical processes have been proposed for oxygen production, and they fall into two categories, absorption-desorption systems and oxygen-yielding reductions. The latter type of process is useful for producing small quantities of oxygen in localized areas, as for example oxygen-generating masks. Potassium peroxide is a typical $O_2$ source. Since the compound is consumed in the process, it is obviously unsuitable for tonnage production.

The absorption-desorption systems depend on a compound which can absorb or adsorb oxygen from the air under one set of conditions and then desorb the oxygen under a second set of conditions. As the compound is reused again and again, such chemical processes are adapted to tonnage production. Typical compounds which have been suggested are cuprous chloride, chromium oxide, manganates, potassium chloride and barium oxide. These processes failed to achieve commercial success, ultimately, because the liquefaction processes proved cheaper. The problems encountered with the chemical processes included reagent losses, production of impure oxygen, low efficiency, a loss of absorption power after a number of cycles and, particularly, the processes are inherently batch type, not adapted for continuous operation. A typical arrangement is to alternately blow air through a mass of the carrier compound and, when the oxygen is absorbed, change the conditions appropriately and draw the oxygen off.

Toward the end of the last century, oxygen was produced on a commercial scale by the so-called Brin process in which barium oxide was loaded in retorts in a furnace. The retorts were maintained at about 700° C. When air was passed through these retorts at about 2 atms. of pressure, the barium oxide was converted to barium peroxide. The supply of air was then cut off and the retort was evacuated, whereupon the barium peroxide previously formed was decomposed at the subatmospheric pressure to barium oxide and oxygen. When oxygen was no longer liberated, compressed air was again supplied to the retorts and the cycle was repeated.

The chemistry of the Brin process is quite simple and forms the basis of the present invention. By making the process continuous, however, it becomes a economic, commercial process for tonnage oxygen production.

It is thus an object of the present invention to provide an economic, chemical process for tonnage oxygen production.

Another object of the present invention is to provide a continuous process for oxygen production employing a barium oxide carrier.

Still another object of the present invention is to produce high-purity oxygen by a chemical process which is cheaper than currently-employed physical separation processes.

Various other objects and advantages of the invention will become clear in the course of the following description of an embodiment thereof, and the novel features will be particularly pointed out in connection with the appended claims.

Barium oxide (BaO) has a specific gravity of 5.72, melts at 1,923° C., and boils at a slightly higher temperature. As is typical with alkaline earth metals, the peroxide ($BaO_2$) melts at a much lower temperature, 450° C., and loses the second oxygen atom at 800° C. Specific gravity of the peroxide is 4.96.

In accordance with the present invention, the reactants comprise a mixture of solid barium oxide suspended in molten barium peroxide which is transported continuously between an oxidizing section and a decomposing section. The employment of these principles, i.e., continuous transport of reactants between separate oxidizing and decomposing zones, results in extremely pure oxygen production and also imposes no practical limit on plant size. The key to operating continuously is, of course, the use of a liquid phase carrier.

As in the Brin process, the present process is based on the following reversible reaction:

BaO (s) + ½$O_2$ (g) = $BaO_2$ (s)

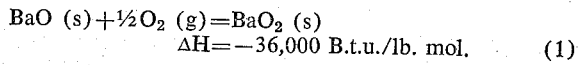
$\Delta H = -36,000$ B.t.u./lb. mol.    (1)

In essence, the following steps and procedures are employed. Air which has been previously purified by suitable standard treatment to remove carbon dioxide, water vapor and dust, passes through a heat exchanger recovering heat from the product oxygen stream. It is then combined with a molten barium peroxide-solid barium oxide slurry from the bottom of an oxygen separator and passes through an oxidizer. The heat of formation of barium peroxide is removed by generating steam in the oxidizer. The temperature in the oxidizer is maintained at about 600° C., and the pressure is only slightly above atmospheric pressure, and is only that pressure required to move the barium oxides-air system into the subsequent stages of the process. The mixture from the oxidizer passes into a separator drum. The spent air leaving the drum is taken to a steam generator for waste heat recovery, if desired. The barium oxides mixture from the bottom of the drum is pumped through a fired preheater coil in which the temperature is raised to approximately 800° C., and then introduced into an oxygen separator which is maintained at approximately 0.25 atm. Here the barium peroxide formed in the oxidizer is reduced to barium oxide (i.e. the reverse of Equation 1). The heat of decomposition is supplied by the sensible heat of the reactants and, as a result, the barium oxides leaving the oxygen separator are cooled from the inlet temperature of 800° C. to 720° C. for the particular designed used. The cycle just described visualizes a mixture of barium oxide and barium peroxide containing approximately 14% barium oxide entering the oxidizer and approximately 7% barium oxide leaving the oxidizer. As the system is invariant, pressure and temperature will be essentially fixed. Heat of decomposition is supplied by the heat capacity of the mixture, so for any given pressure the extent of peroxide decomposition is fixed by the equilibrium temperature, the recirculation rate and composition. Of course, it will be understood that different temperatures, pressures and compositions may prevail in particular installations.

Understanding of the invention will be facilated by referring to the accompanying drawing, which is a greatly simplified schematic flow sheet of one embodiment of the invention. It will be understood that other processing units can be substituted for those illustrated.

In the drawing, air purified of $CO_2$, water and dust is introduced in line 10 and compressed at 12 to a sufficient pressure to mix it with the oxides stream. It is then passed in line 14 through a product heat exchanger 16, where it is indirectly preheated by hot oxygen product gas. The air then passes in line 18 into oxides slurry stream 20 or, alternately, lines 18 and 20 can be introduced separately into oxidizer 22. The end in view is to get as thorough mixture of the air with the oxides slurry as possible. As noted above, the slurry at this point may contain 14% solid BaO suspended in 86% liquid $BaO_2$, inlet temperature being about 700° C. Boiler feed water in line 24 removes the heat of reaction. During oxidation, the BaO content of the slurry drops to about 7%.

The solid-liquid-gas mixture is then passed in line 26 to spent air separator 28, wherein the spent air is removed as overhead in line 30 and the $BaO_2$-enriched slurry is passed out the bottom in line 32. While separator 28 is shown as a simple knock-out drum, other gas-liquid separators can be employed, and a fluid bed might even be utilized.

A pump 34 is used to impart enough pressure to the stream to pass it through line 36, fired preheater 38, line 40 and thence into oxygen separator 42. The preheater heats the stream to above the decomposition temperature (800° C. at 1 atm.). Combustion gases in line 44, which may have spent air from line 30 added thereto, are passed through a waste heat boiler 46 where steam is generated prior to being vented.

Oxygen formed by the decomposition of $BaO_2$ is intimately mixed in the slurry, and $O_2$ separator 42 is provided with suitable trays, baffles, etc. so as to facilitate the separation. Separator 42 is under a reduced pressure, generally about 0.25 atm. The slurry, now back to its original concentration of about 14% BaO, is pumped by pump 48 back into line 20 for reuse. Exit temperature is about 720° C.

High purity oxygen is withdrawn from separator 42 in line 50, is used as a heat exchange medium to preheat air in exchanger 16, and is then passed in line 52 to oxygen compressor 54, and oxygen cooler 56. The oxygen is then sent to storage or use.

For the purposes of illustration, the following data are tabulated for the described process for a plant capable of producing 120 tons per day of high purity oxygen:

| | |
|---|---|
| Combined oxides circulation | g.p.m. 625 |
| Oxygen compressor | H.P. 160 |
| Air compressor | H.P. 625 |
| Diameter of oxygen separator | ft. 4 |
| Diameter of air separator | ft. 6 |
| Oxidizer heat transfer area | sq. ft. 300 |
| Fired heater duty | b.t.u./hr. 27.0MM |
| Waste heat boiler | b.t.u./hr. 15.0MM |
| Air-oxygen exchanger | sq. ft. 1,800 |

For the described process, the steam generated in oxidizer 22 and the waste heat boiler 46 just about balance the fuel consumed in fired preheater 38. Hence, the net utilities for the process are the power for the compressors and a relatively small amount of cooling water for the oxygen cooler and other miscellaneous uses.

It is to be noted that the decomposition of the peroxide is rapid and spontaneous at the conditions existing at the point of oxygen removal. On the other hand, the oxidation step requires a certain amount of time since this involves a diffusional process which requires the oxygen in the air to diffuse through the air film to the surface of the liquid and then to diffuse through the liquid film to the barium oxide particle.

In general, the oxygen separator should operate in a temperature range of 700–850° C. and a pressure range of 0.1 atm. to 1+ atms., whereas the oxidizer and spent air separator operate in a temperature range of 500° C. to 720° C., and a pressure range of 1 to about 4 atms.

As should be clear to those skilled in the art, changes may be made in the process. For example, flow characteristics of the circulating oxides stream can be improved by employing a molten, inert carrier for the barium oxides. Lithium, sodium, or potassium hydroxide, or other materials with suitable melting points, physical properties and chemical inertness can be employed in this service. As noted above, different reaction vessels can be employed at each stage. Also, by proper pressure control it is possible to carry out the process essentially isothermally. Various other changes in the details, steps, materials and arrangements of parts, which have been herein described and illustrated in order to explain the nature of the invention, may be made by those skilled in the art within the principle and scope of the invention as defined in the appended claims.

What is claimed is:
1. Process for continuous production of high purity oxygen comprising:
   (a) mixing air, solid barium oxide and liquid barium peroxide in a first zone under conditions controlled to oxidize at least a portion of said barium oxide to barium peroxide;
   (b) separating oxygen-depleted air from the mixture of step (a);
   (c) passing said mixture to a second zone maintained at conditions controlled to reduce a portion of said barium peroxide to solid barium oxide and oxygen;
   (d) continuously withdrawing high purity oxygen from said second zone; and
   (e) recycling the mixture of solid barium oxide and liquid barium peroxide remaining after step (d) to step (a).

2. The process as claimed in claim 1, wherein said first zone is maintained at a temperature in the range of about 500° C. to about 720° C. and a pressure within the range of about 1 to about 4 atmospheres, and said second zone is maintained in the range of about 700° C. to about 850° C. and a pressure in the range of 0.1 to about 1 atmosphere.

3. The process as claimed in claim 1, wherein said first zone comprises an oxidizing vessel and an air separating vessel.

4. The process as claimed in claim 1, wherein said second zone comprises a heater and an oxygen separator.

5. The process as claimed in claim 1, and additionally comprising utilizing the oxygen withdrawn in step (d) to preheat said air prior to step (a).

6. The process as claimed in claim 2, wherein said second zone is maintained at said temperature by combustion of a fuel, and additionally comprising recovering heat from the combustion products of said combustion after passage through said zone.

7. Process for the continuous production of high purity oxygen comprising:
   (a) preheating air;
   (b) mixing said preheated air with a mixture of solid barium oxide and liquid barium peroxide maintained at about 500° to 720° C. and about 1 to 4 atmospheres, whereby a portion of said barium oxide is oxidized to liquid barium peroxide;
   (c) passing said mixture to a first separation zone and withdrawing oxygen-depleted air therefrom;
   (d) heating the mixture from step (c) to a temperature of from about 700° to 850° C. and reducing the pressure to about 0.1 to 1 atmosphere, whereby a portion of said barium peroxide is reduced to solid barium oxide and oxygen;
   (e) passing the mixture from step (d) to a second separation zone and continuously withdrawing high purity oxygen therefrom;
   (f) utilizing said oxygen as a heat exchange medium in step (a); and
   (g) recycling said mixture from step (e) to step (b).

8. In a process for producing oxygen from barium oxide by oxidizing said barium oxide in air to form barium peroxide followed by reducing said barium peroxide to barium oxide and oxygen and recovering the oxygen in pure form, the improvements comprising:

mixing the barium oxide with liquid barium peroxide and passing the slurry thus produced continuously through said oxidizing, reducing and recovery steps, whereby said process is rendered substantially continuous.

9. The process as claimed in claim 8, and additionally comprising mixing said slurry with a liquid selected from the group consisting of the hydroxides of lithium, sodium, potassium and mixtures thereof.

References Cited by the Examiner
UNITED STATES PATENTS

| 1,048,812 | 12/1912 | Doherty | 23—221 |
| 2,418,402 | 4/1947 | Gorin | 23—221 |

OSCAR R. VERITZ, *Primary Examiner.*

H. S. MILLER, *Assistant Examiner.*